(12) United States Patent
Zhang et al.

(10) Patent No.: US 10,634,810 B2
(45) Date of Patent: Apr. 28, 2020

(54) SCANNING IMAGING SYSTEM FOR SECURITY INSPECTION OF AN OBJECT AND IMAGING METHOD THEREOF

(71) Applicants: Nuctech Company Limited, Beijing (CN); Tsinghua University, Beijing (CN)

(72) Inventors: Li Zhang, Beijing (CN); Zhiqiang Chen, Beijing (CN); Le Shen, Beijing (CN); Qingping Huang, Beijing (CN); Yunda Sun, Beijing (CN); Xin Jin, Beijing (CN); Hui Ding, Beijing (CN); Yuxiang Xing, Beijing (CN)

(73) Assignees: Nuctech Company Limited, Beijing (CN); Tsinghua University, Beijing (CN)

( * ) Notice: Subject to any disclaimer, the term of this patent is extended or adjusted under 35 U.S.C. 154(b) by 14 days.

(21) Appl. No.: 16/037,810

(22) Filed: Jul. 17, 2018

(65) Prior Publication Data

US 2019/0094407 A1 Mar. 28, 2019

(30) Foreign Application Priority Data

Sep. 26, 2017 (CN) .......................... 2017 1 0882633

(51) Int. Cl.
*G01N 23/00* (2006.01)
*G01V 5/00* (2006.01)
*G01N 23/046* (2018.01)

(52) U.S. Cl.
CPC ........... *G01V 5/005* (2013.01); *G01N 23/046* (2013.01); *G01V 5/0058* (2013.01); *G01N 2223/20* (2013.01); *G01N 2223/3307* (2013.01)

(58) Field of Classification Search
CPC . G01N 23/04; G01N 2223/643; G01N 23/046
See application file for complete search history.

(56) References Cited

U.S. PATENT DOCUMENTS 6,236,709 B1 5/2001 Perry et al.
2004/0017888 A1 1/2004 Seppi et al.
(Continued)

FOREIGN PATENT DOCUMENTS

CN 103908281 A 7/2014
CN 104345070 A 2/2015
(Continued)

OTHER PUBLICATIONS

First Office Action in CN 201710882633.3, dated Feb. 28, 2019, China National Intellectual Property Agency, China.
(Continued)

*Primary Examiner* — Dani Fox
(74) *Attorney, Agent, or Firm* — Schwegman Lundberg & Woessner, P.A.

(57) ABSTRACT

The disclosure provides a scanning imaging system for security inspection of an object and an imaging method thereof, the system comprising: a conveying unit configured for bringing the object to move along a conveying direction; a plurality of radiographic sources at one side of the conveying unit, being arranged successively in a direction vertical to a plane, in which the conveying unit is located, and configured for alternately emitting ray beams to form a scanning area; a linear detector array at the other side of the conveying unit, being configured for detecting first projection images, which are formed after the ray beams emitted by the plurality of radiographic sources penetrate through the object, in the process of the object passing through the scanning area; an imaging unit configured for obtaining a (Continued)

first reconstructed image of the object based on the first projection images of the plurality of radiographic sources.

17 Claims, 10 Drawing Sheets

(56) References Cited

U.S. PATENT DOCUMENTS

| | | |
|---|---|---|
| 2009/0116617 A1 | 5/2009 | Mastronardi et al. |
| 2012/0236988 A1 | 9/2012 | Den et al. |
| 2014/0294147 A1 | 10/2014 | Chen et al. |
| 2016/0051211 A1 | 2/2016 | Linev |

FOREIGN PATENT DOCUMENTS

| | | |
|---|---|---|
| CN | 204359711 U | 5/2015 |
| CN | 105445290 A | 3/2016 |
| CN | 105606633 A | 5/2016 |
| CN | 107677693 A | 2/2018 |
| CN | 207263665 U | 4/2018 |
| EP | 2713156 A1 | 4/2014 |
| WO | WO-2011091070 A2 | 7/2011 |
| WO | WO-2013078344 A1 * | 5/2013 |
| WO | WO-2013078344 A1 | 5/2013 |
| WO | WO-2016141595 A1 * | 9/2016 ............... G01V 5/00 |
| WO | WO-2016141595 A1 | 9/2016 |

OTHER PUBLICATIONS

"European Application No. 18178449.7, Extended European Search Report dated Dec. 13, 2018", (Dec. 13, 2018), 10 pgs.

"International Application No. PCT/CN2018/088427, International Search Report dated Aug. 20, 2018", (Aug. 20, 2018), 11 pgs.

* cited by examiner

SCANNING IMAGING SYSTEM FOR SECURITY INSPECTION OF AN OBJECT AND IMAGING METHOD THEREOF

CROSS-REFERENCE TO RELATED APPLICATIONS

This application claims priority to Chinese Patent Application No. 201710882633.3, filed on Sep. 26, 2017, which is hereby incorporated by reference in its entirety.

FIELD OF THE INVENTION

The disclosure relates to a field of radiation imaging, and in particular to a scanning imaging system for security inspection of an object and an imaging method thereof.

BACKGROUND

At present, security matters are being paid more and more attentions, and various public places are equipped with a variety of security inspection devices. Security inspectors may recognize dangerous objects from transmission images of objects to be inspected. The transmission images of an object to be inspected include two-dimensional and three-dimensional images, wherein the three-dimensional images are more recognizable than the two-dimensional images as problems caused by overlapping of the two-dimensional images along the thickness direction thereof may be eliminated. Usually, the imaging of a three-dimensional image of the object to be inspected is to revolve radiographic sources around the object to be inspected and to reconstruct an image of the internal structure of the object to be inspected by using transmission data from different angles of the object to be inspected.

Because of the complex structure of the equipment to revolve the radiographic sources around the object to be inspected, a linear scanning based imaging method is developed, in which the radiographic sources are fixed at one side of a scanning channel and the object to be inspected is moved relative to the radiographic sources along a broken line, and the transmission data of the object to be inspected from different angles are used to reconstruct the image of the internal structure of the object to be inspected.

However, the inventor of this application found that data in a cone angle direction of the radiographic sources is incomplete in the linear scanning based imaging method, which leads to existence of artifacts in the reconstructed image of the object to be inspected.

SUMMARY OF THE INVENTION

Embodiments of the disclosure provide a scanning imaging system for security inspection of an object and an imaging method thereof, which may solve the problem that the data in the cone angle direction of the radiographic sources is incomplete and thus eliminate the artifacts in the reconstructed image of the object to be inspected.

In a first aspect, embodiments of the disclosure provide a scanning imaging system for security inspection of an object, comprising:

a conveying unit configured for bringing the object to move along a conveying direction of the conveying unit;

a plurality of radiographic sources at one side of the conveying unit, the plurality of radiographic sources being arranged successively in a direction vertical to a plane, in which the conveying unit is located, and configured for alternately emitting ray beams to form a scanning area;

a linear detector array at the other side of the conveying unit, the linear detector array being configured for detecting first projection images, which are formed after the ray beams emitted by the plurality of radiographic sources penetrate through the object, in the process of the object passing through the scanning area; and an imaging unit configured for obtaining a first reconstructed image of the object based on the first projection images of the plurality of radiographic sources.

In some embodiments of the first aspect, the plurality of radiographic sources are arranged such that a projection of a vertical line, on which the plurality of radiographic sources are located, on the linear detector array is at a middle position of the linear detector array.

In some embodiments of the first aspect, the linear detector array comprises a plurality of linear-array detectors arranged successively along the conveying direction of the conveying unit, the plurality of linear-array detectors being configured for detecting the first projection images, which are formed after the ray beams emitted by the plurality of radiographic sources penetrate through the object, in the process of the object passing through the scanning area, respectively.

In some embodiments of the first aspect, the plurality of linear-array detectors are arranged centripetally around a vertical line, on which the plurality of radiographic sources are located.

In some embodiments of the first aspect, the scanning imaging system further comprises a revolving unit at an end of the conveying unit, the revolving unit being configured for revolving the object through a preset angle when the object passes through the scanning area and moves to an end of the conveying unit, wherein the conveying unit is further configured for bringing the revolved object to pass through the scanning area, the linear detector array is further configured for detecting second projection images, which are formed after the ray beams emitted by the plurality of radiographic sources penetrate through the revolved object, in the process of the revolved object passing through the scanning area, and the imaging unit is further configured for obtaining a second reconstructed image of the object based on the first projection images and the second projection images of the plurality of radiographic sources.

In some embodiments of the first aspect, the scanning imaging system further comprises a pulse generator configured for generating a trigger pulse sequence for controlling the plurality of radiographic sources to alternately emit the ray beams.

In some embodiments of the first aspect, the trigger pulse sequence comprises trigger pulse signals corresponding to the plurality of radiographic sources one by one within each cycle, the trigger pulse signals being used for controlling the radiographic sources to emit the ray beams with the same energy.

In some embodiments of the first aspect, the trigger pulse sequence comprises trigger pulse signal groups corresponding to the plurality of radiographic sources one by one within each cycle, the trigger pulse signal group comprising a first trigger pulse signal and a second trigger pulse signal, which are used for controlling a corresponding radiographic source to emit a first sub ray beam with first energy and a second sub ray beam with second energy in turn.

In some embodiments of the first aspect, the scanning imaging system further comprises a decomposing unit configured for decomposing the first projection images into first sub projection images corresponding to the first sub ray beam and second sub projection images corresponding to the second sub ray beam, wherein the imaging unit is further configured for obtaining the first reconstructed image of the object based on the first sub projection images and the second sub projection images.

In some embodiments of the first aspect, the radiographic sources are acceleration radiographic sources.

In a second aspect, embodiments of the disclosure provide a scanning imaging method for security inspection of an object, the scanning imaging method applied to the above scanning imaging system for security inspection of an object and comprising:

enabling the plurality of radiographic sources to alternately emit ray beams to form a scanning area;

enabling the conveying unit to bring the object to move along a conveying direction and thus pass through the scanning area;

detecting, by the linear detector array, first projection images, which are formed after the ray beams emitted by the plurality of radiographic sources penetrate through the object, in the process of the object passing through the scanning area; and obtaining, by the imaging unit, a first reconstructed image of the object based on the first projection images of the plurality of radiographic sources.

In some embodiments of the second aspect, the linear detector array comprises a plurality of linear-array detectors arranged successively along the conveying direction of the conveying unit, the scanning imaging method further comprising: detecting, respectively by the plurality of linear-array detectors, the first projection images, which are formed after the ray beams emitted by the plurality of radiographic sources penetrate through the object, in the process of the object passing through the scanning area.

In some embodiments of the second aspect, the step of obtaining the first reconstructed image of the object comprises: reconstructing the first reconstructed image of the object from the first projection images of the plurality of radiographic sources with a CT reconstructing algorithm.

In some embodiments of the second aspect, the scanning imaging system further comprises a revolving unit at an end of the conveying unit, the scanning imaging method further comprising:

revolving, by the revolving unit, the object through a preset angle when the object passes through the scanning area and moves to an end of the conveying unit;

bringing, by the conveying unit, the revolved object to pass through the scanning area;

detecting, by the linear detector array, second projection images, which are formed after the ray beams emitted by the plurality of radiographic sources penetrate through the revolved object, in the process of the revolved object passing through the scanning area; and obtaining, by the imaging unit, a second reconstructed image of the object based on the first projection images and the second projection images of the plurality of radiographic sources.

In some embodiments of the second aspect, the scanning imaging system further comprises a pulse generator, before the step of forming the scanning area, the scanning imaging method further comprising: generating, by the pulse generator, a trigger pulse sequence for controlling the plurality of radiographic sources to alternately emit the ray beams.

In some embodiments of the second aspect, the trigger pulse sequence comprises trigger pulse signals corresponding to the plurality of radiographic sources one by one within each cycle, the trigger pulse signals being used for controlling the radiographic sources to emit the ray beams with the same energy.

In some embodiments of the second aspect, the trigger pulse sequence comprises trigger pulse signal groups corresponding to the plurality of radiographic sources one by one within each cycle, the trigger pulse signal group comprising a first trigger pulse signal and a second trigger pulse signal, which are used for controlling a corresponding radiographic source to emit a first sub ray beam with first energy and a second sub ray beam with second energy in turn.

In some embodiments of the second aspect, the scanning imaging system further comprises a decomposing unit, the step of obtaining the first reconstructed image of the object comprising:

decomposing, by the decomposing unit, the first projection images into first sub projection images corresponding to the first sub ray beam and second sub projection images corresponding to the second sub ray beam;

obtaining, by the imaging unit, the first reconstructed image of the object based on the first sub projection images and the second sub projection images.

In the scanning imaging system for security inspection of an object in accordance with embodiments of the disclosure, during security inspection of the object, the object may be brought by the conveying unit to move along the conveying direction of the conveying unit and thus pass through the scanning area formed by the ray beams alternately emitted by the plurality of radiographic sources arranged successively along the direction vertical to the plane in which the conveying unit is located; the first projection images, which are formed after the ray beams emitted by the plurality of radiographic sources penetrate through the object, in the process of the object passing through the scanning area are detected by the linear detector array; the first reconstructed image of the object is obtained by the imaging unit based on the first projection images of the plurality of radiographic sources. As the plurality of radiographic sources are distributed at different heights, the imaging unit may obtain multiple sets of data in the cone angle direction of the plurality of radiographic sources at different heights in one scanning process, thus solving the problem that the data in the cone angle direction of the radiographic sources is incomplete and eliminating the artifacts in the reconstructed image of the object to be inspected.

DESCRIPTION OF THE DRAWINGS

The disclosure may be better understood from description of specific implementations in conjunction with the accompanying drawings, in which same or similar reference numbers represent same or similar features.

DETAILED DESCRIPTION

Features and exemplary embodiments of various aspects of embodiments of the disclosure will be described in detail below. In the detailed description below, a number of specific details are presented in order to provide a thorough understanding of embodiments of the disclosure. However, it is obvious for those ordinary skilled in the art that embodiments of the disclosure may be implemented without some of these details. The following description of embodiments of the disclosure is merely to provide a better understanding of the embodiments of the disclosure by providing examples of the embodiments of the disclosure.

Embodiments of the disclosure provide a scanning imaging system for security inspection of an object and an imaging method thereof, which are suitable for security inspection of objects in various public places, capable of obtaining distribution maps of attenuation coefficients within the objects and automatically recognizing dangerous objects, and advantageous in security inspection of large-size objects such as containers.

Figure 1:
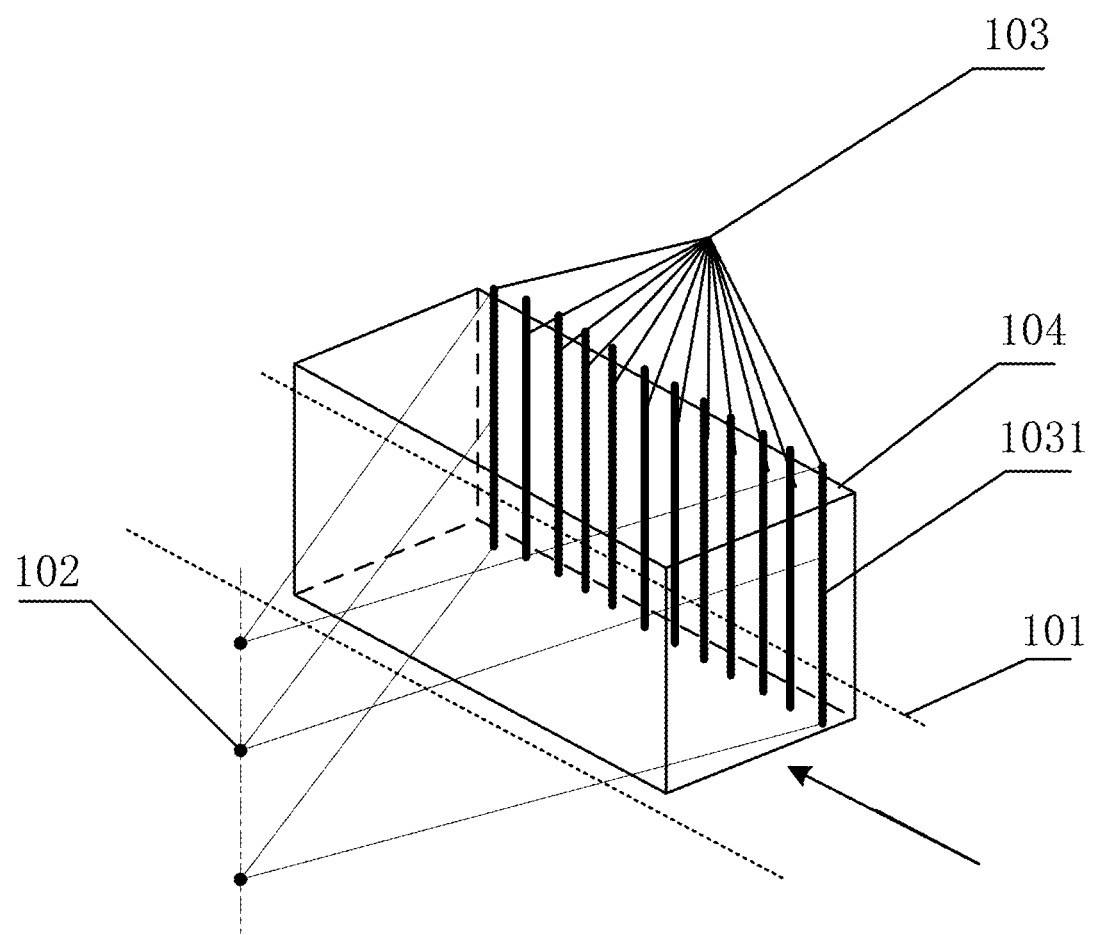
FIG. 1 is a schematic diagram of a three-dimensional structure of a scanning imaging system for security inspection of an object in accordance with an embodiment of the disclosure.

FIG. 1 is a schematic diagram of a structure of the scanning imaging system for security inspection of an object in accordance with an embodiment of the disclosure. As shown in FIG. 1, the scanning imaging system includes a conveying unit 101, a plurality of radiographic sources 102, a linear detector array 103 and an imaging unit (not shown).

The conveying unit 101 is configured for bringing the object to move along a conveying direction (as indicated by an arrow in FIG. 1) of the conveying unit 101. The conveying unit 101 may be embodied as for example, a belt conveyor, a link conveyor, a gear conveyor or any other conveyors. There is no restriction on the conveying unit. Usually, an object to be inspected is placed above the conveying unit 101. It should be noted that a power mechanism of the conveying unit 101 may support both one-way conveying and two-way conveying.

The plurality of radiographic sources 102 are located at one side of the conveying unit 101 and arranged successively in a direction vertical to a plane, in which the conveying unit 101 is located. That is, the plurality of radiographic sources 102 are distributed at different heights on a vertical line. The plurality of radiographic sources 102 alternately emit ray beams to form a scanning area. For example, the radiographic sources 102 may be acceleration radiographic sources having adjustable energy and strong penetrating power.

The linear detector array 103 is located at the other side of the conveying unit 101 and arranged corresponding to the plurality of radiographic sources 102. The linear detector array 103 is configured for detecting first projection images, which are formed after the ray beams emitted by the plurality of radiographic sources 102 penetrate through the object, in the process of the object passing through the scanning area. The ray beams emitted by the plurality of radiographic sources 102 will decay after penetrating through the object, that is, a part of the ray beams will be absorbed by the object, so the first projection images will be formed after the decay.

The ray beam emitted by each radiographic source 102 corresponds to a set of first projection images, and the ray beams emitted by the plurality of radiographic sources 102 may correspond to multiple sets of first projection images.

The imaging unit is configured for obtaining a first reconstructed image of the object based on the first projection images of the plurality of radiographic sources 102, that is, the multiple sets of first projection images. For example, a CT reconstructing algorithm may be used for reconstructing the first reconstructed image of the object from the first projection images of the plurality of radiographic sources 102. The first reconstructed image may be a distribution map of attenuation coefficients, an atomic number map and/or an electron density map. The CT reconstructing algorithm may be an iterative reconstructing algorithm, for example, an algebraic reconstructing algorithm, a statistical iterative algorithm and so on.

As described above, in the scanning imaging system for security inspection of an object in accordance with embodiments of the disclosure, in security inspection of the object, the conveying unit 101 brings the object to move along the conveying direction of the conveying unit 101 and thus pass through the scanning area formed by the ray beams alternately emitted by the plurality of radiographic sources 102 arranged in the direction vertical to the plane, in which the conveying unit is located; the linear detector array 103 detects the first projection images, which are formed after the ray beams emitted by the plurality of radiographic sources 102 penetrate through the object, in the process of the object passing through the scanning area; the imaging unit obtains the first reconstructed image of the object based on the first projection images of the plurality of radiographic sources 102. As the plurality of radiographic sources 102 are distributed at different heights, the imaging unit may obtain multiple sets of data in a cone angle direction of the plurality of radiographic sources 102 at different heights, thus solving the problem that data in the cone angle direction of the radiographic sources 102 is incomplete in the prior art and eliminating artifacts in the reconstructed image of the object.

Figure 2:
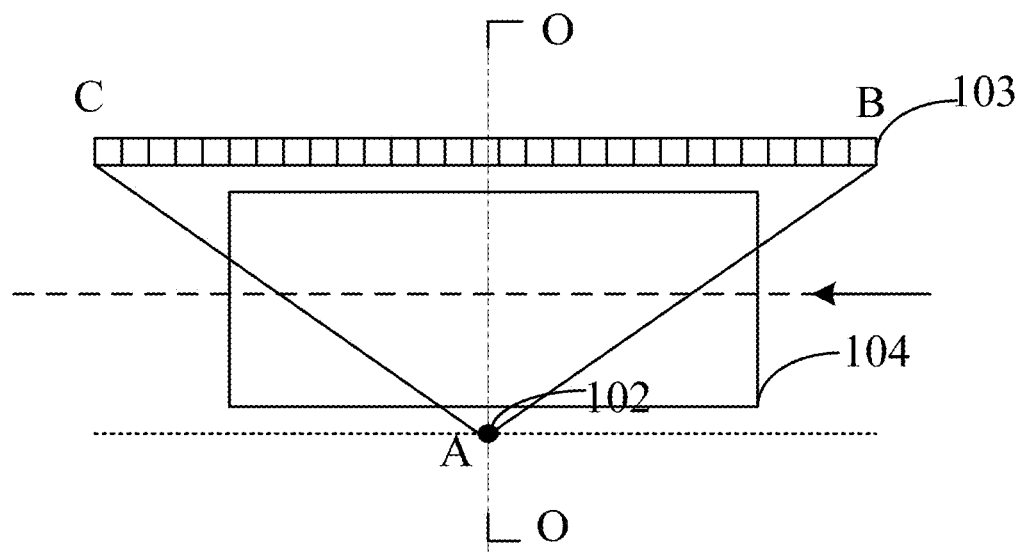
FIG. 2 is a top view of the scanning imaging system for security inspection of an object in accordance with an embodiment of the disclosure.

In a preferred example, as shown in FIG. 2, the plurality of radiographic sources 102 are arranged such that a projection of a vertical line, on which the plurality of radiographic sources 102 are located, on the linear detector array 103 is at a middle position of the linear detector array 103. The plurality of radiographic sources 102 are arranged in a manner shown in FIG. 2, in which the distance between points A and C and the distance between points A and B are equal. As radiation doses of the ray beams decay inversely proportional to the square of the distances, there is no obvious noise difference between the multiple sets of first projection images (i.e. projection data) corresponding to the plurality of radiographic sources 102, which improves consistency and accuracy of the projection data for imaging.

In order to completely cover the object to be inspected in height, the number of the radiographic sources 102 may be determined according to distances between the radiographic sources 102 and the linear detector array 103. For example, more radiographic sources 102 may be arranged at locations nearer to the linear detector array 103, and less radiographic sources 102 may be arranged at locations farther to the linear detector array 103.

Figure 3:
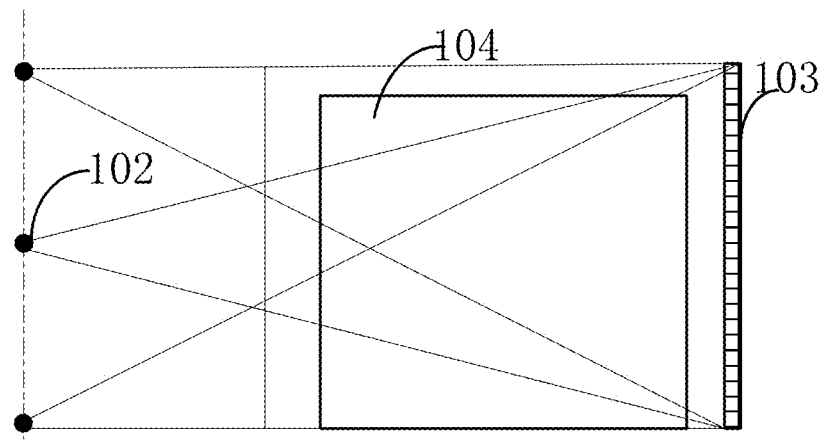
FIG. 3 is a sectional view of the scanning imaging system for security inspection of an object along the O-O plane in FIG. 2 in accordance with an embodiment of the disclosure.
Figure 4:
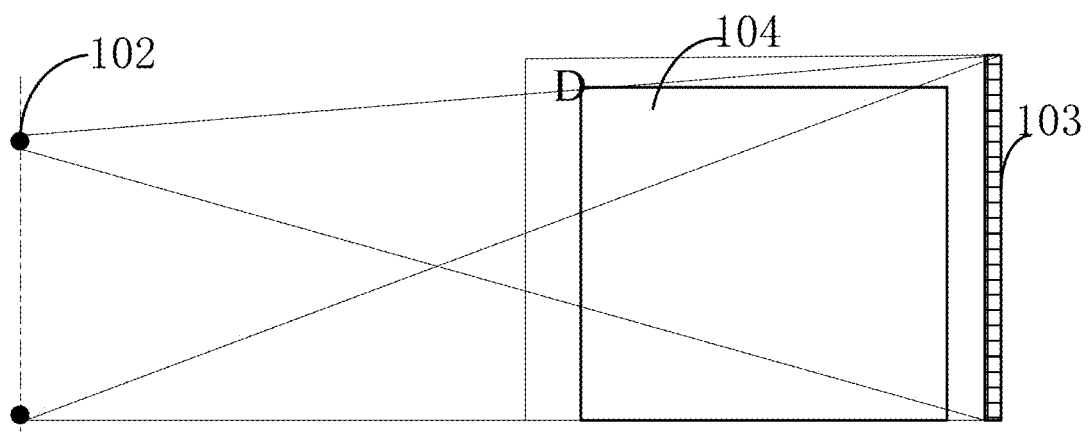
FIG. 4 is a sectional view of the scanning imaging system for security inspection of an object along the O-O plane in FIG. 2 in accordance with another embodiment of the disclosure.

For example, as shown in FIGS. 3 and 4, point D indicates the height of the object to be inspected, and the distance between the vertical line, on which the radiographic sources 102 are located, and the linear detector array 103 is less in FIG. 3 than in FIG. 4. In order to completely cover the object 104 to be inspected in height (that is, in order to cover the point D), it is necessary to arrange at least three radiographic sources 102 in FIG. 3 and arrange at least two radiographic sources 102 in FIG. 4.

According to embodiments of the disclosure, the linear detector array 103 may include a plurality of linear-array detectors 1031 (see FIG. 1) arranged successively along the conveying direction of the conveying unit 101, and the plurality of linear-array detectors 1031 are configured for detecting the first projection images, which are formed after the ray beams emitted by the plurality of radiographic sources 102 penetrate through the object, in the process of the object passing through the scanning area, respectively. Compared with plane-array detectors, the arrangement of the plurality of linear-array detectors 1031 is more flexible and costless.

In an example, the number of radiographic sources 102 is M, the number of linear-array detectors 1031 in the linear detector array 103 is N, and both M and N are positive integers greater than 2. Each linear-array detector 1031 may capture a transmission image of the ray beam emitted by each radiographic source 102 at a certain angle, that is, a piece of projection data, so M*N pieces of projection data may be obtained during a single scanning process.

Figure 5:
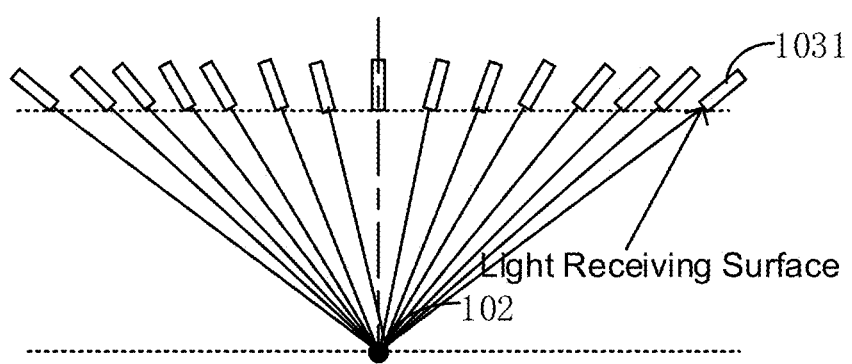
FIG. 5 is a layout diagram of a plurality of linear-array detectors in accordance with an embodiment of the disclosure.

In a preferred example, the plurality of linear-array detectors 1031 are arranged centripetally around the vertical line, on which the plurality of radiographic sources 102 are located. FIG. 5 is a top view of the plurality of linear-array detectors 1031. Each linear-array detector 1031 shown in FIG. 5 is arranged to deflect towards the vertical line, on which the radiographic sources 102 are located.

Each linear-array detector 1031 may be composed of a plurality of sub detectors stacked along the height direction thereof, and there may exist a gap between two neighboring sub detectors or the neighboring sub detectors may be connected seamless. For example, each sub detector may be a rectangular crystal. Here, a surface facing towards the radiographic sources 102 of each rectangular crystal is called a light receiving surface, or a surface wholly facing towards the radiographic sources 102 of each linear-array detector 1031 is called the light receiving surface. The ray beams emitted by the radiographic sources 102 will pass through the light receiving surface and enter each rectangular crystal, and the projection images are generated after the ray beams are absorbed by the rectangular crystal. Furthermore, "the plurality of linear-array detectors 1031 are arranged centripetally around the vertical line, on which the plurality of radiographic sources 102 are located" may be further interpreted as "the plurality of linear-array detectors 1031 are arranged such that a line vertical to the light receiving surface of each linear-array detector 103 crosses or intersects the vertical line, on which the plurality of radiographic sources 102 are located".

Figure 6:
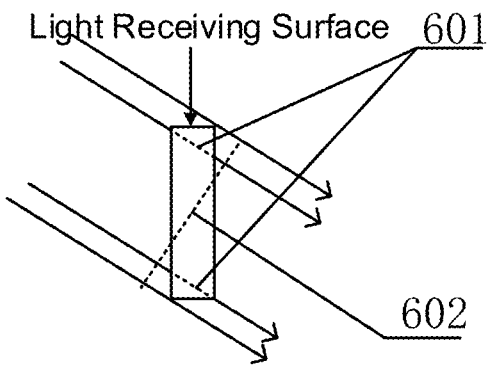
FIG. 6 is a schematic diagram of ray beams emitted by radiographic sources being obliquely incident to a crystal in the prior art.

FIG. 6 is a schematic diagram of the ray beams emitted by the radiographic sources 102 being obliquely incident to the crystal in the prior art. As can be seen from FIG. 6, when the ray beams are obliquely incident to the crystal, the thickness penetrated through by the ray beams of the crystal (shown by dotted line 601) is far smaller than the actual thickness of the crystal, and the equivalent area of the crystal (shown by dashed section 602) is far greater than the actual area of the light receiving surface of the crystal.

Figure 7:
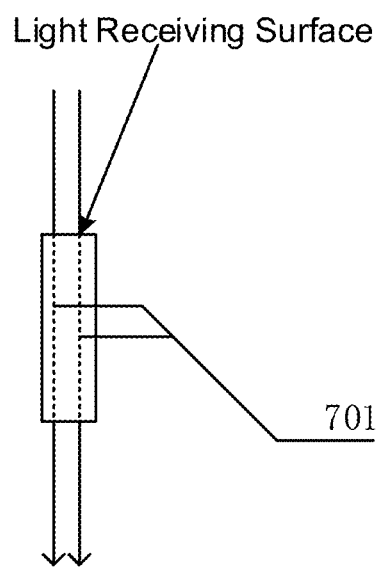
FIG. 7 is a schematic diagram of the ray beams emitted by the radiographic sources being obliquely incident to the crystal in accordance with an embodiment of the disclosure.

FIG. 7 is a schematic diagram of the ray beams emitted by the radiographic sources 102 being vertically incident to the crystal in an embodiment of the disclosure. As shown in FIG. 7, when the ray beams are vertically incident to the crystal, the thickness penetrated through by the ray beams of the crystal (shown by dotted line 701) is equal to the thickness of the crystal, and the equivalent area of the crystal is equal to the actual area of the light receiving surface of the crystal.

Therefore, as compared with the ray beams being obliquely incident to the crystal in the prior art, the ray beams being vertically incident to the crystal in the disclosure, on the one hand, may increase the thickness effectively penetrated through by the ray beams of the crystal, increase the penetrating power of the ray beams and thus make the projection data carried by the detected projection images more comprehensive; on the other hand, may make the equivalent area of the crystal equal to the actual area of the light receiving surface, improve the spatial resolution of the ray beams and thus make the resolution of the projection data carried by the detected projection images higher.

According to an embodiment of the disclosure, the scanning imaging system further includes a revolving unit 901 (see FIG. 9) at an end of the conveying unit 101, the revolving unit 901 being configured for revolving the object through a preset angle when the object passes through the scanning area and moves to an end of the conveying unit 101. For example, each end of the conveying unit may be provided with the revolving unit or only one end of the conveying unit may be provided with the revolving unit.

The conveying unit 101 is further configured for bringing the revolved object to pass through the scanning area; the linear detector array 103 is further configured for detecting second projection images, which are formed after the ray beams emitted by the plurality of radiographic sources 102 penetrate through the revolved object, in the process of the revolved object passing through the scanning area; and the image unit is further configured for obtaining a second reconstructed image of the object based on the first projection images and the second projection images of the plurality of radiographic sources 102.

It should be noted that the steps of revolving the object 104 to be inspected through the preset angle and bringing the object 104 to be inspected to pass through the scanning area may be repeated many times. Usually, the larger the number of the object passing through the scanning area in one inspection, the more comprehensive the object is irradiated, and the higher the quality of the reconstructed image is.

In an example, if the number of the object passing through the scanning area is two during one inspection, the preset angle of revolving the object may be set to 90°±10° in order to make the object to be completely irradiated.

In another example, if the number of the object passing through the scanning area is N during one inspection and N is a positive integer, the preset angle of revolving the object may be set to $(180/N)°±10°$ in order to make the object to be completely irradiated.

According to an embodiment of the disclosure, the scanning imaging system further includes a channel, which mainly provides a radiation protection and shielding function. A shielding door is provided at the exit and entrance of the channel, and the conveying unit 101 is configured to pass through the channel.

Figure 8:
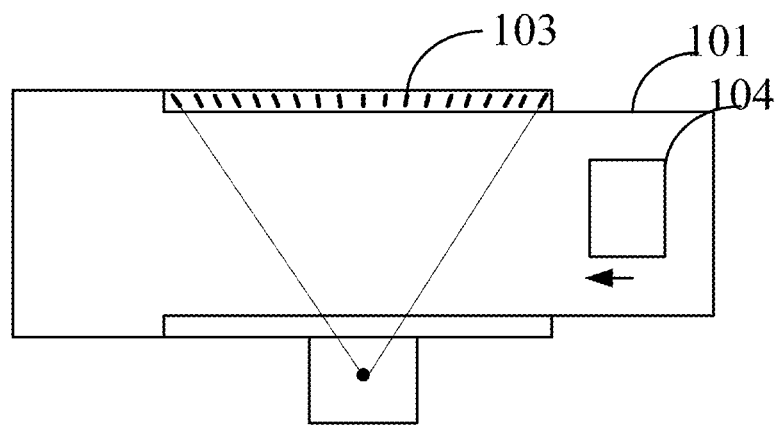
FIG. 8 is a workflow diagram of the scanning imaging system for security inspection of an object in accordance with an embodiment of the disclosure.
Figure 9:
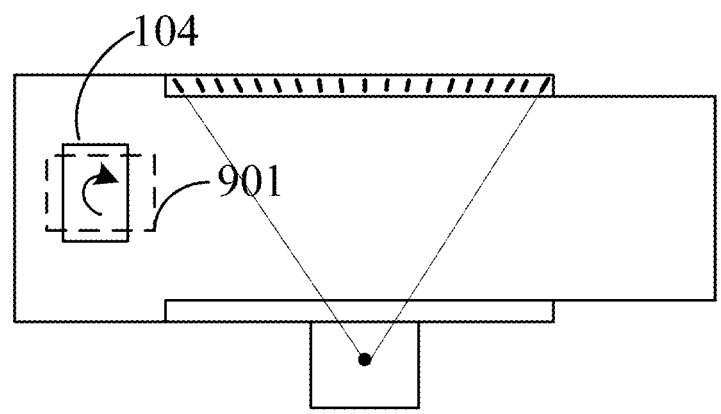
FIG. 9 is another workflow diagram of the scanning imaging system for security inspection of an object in accordance with an embodiment of the disclosure.
Figure 10:
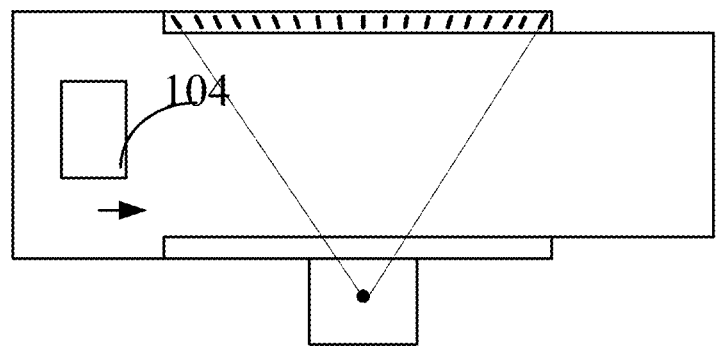
FIG. 10 is yet another workflow diagram of the scanning imaging system for security inspection of an object in accordance with an embodiment of the disclosure.

The working process of the scanning imaging system of embodiments of the disclosure is described in detail below. Specifically, as can be seen from FIGS. 8 to 10, work steps of the scanning imaging system are the following:

the object 104 to be inspected is fixed on the conveying unit 101 to make the object move along the conveying direction of the conveying unit 101 (see FIG. 8);

the ray beams are emitted alternately by the plurality of radiographic sources 102 distributed along the vertical direction to form the scanning area;

the first projection images, which are formed after the ray beams emitted by the plurality of radiographic sources 102 penetrate through the object, in the process of the object passing through the scanning area are detected by the linear detector array 103;

when the object 104 to be inspected moves to the end of the conveying unit 101, the object 104 to be inspected is revolved by the revolving unit 901 arranged at the end of the conveying unit through the preset angle (see FIG. 9);

the revolved object 104 to be inspected is brought by the conveying unit 101 to pass through the scanning area again (see FIG. 10);

the second projection images, which are formed after the ray beams emitted by the plurality of radiographic sources 102 penetrate through the revolved object to be inspected again, in the process of the revolved object 104 to be inspected passing through the scanning area again are detected by the linear detector array 103; and the second reconstructed image of the object to be inspected is obtained by the imaging unit based on the first projection images and the second projection images of the plurality of radiographic sources 102.

Figure 11:
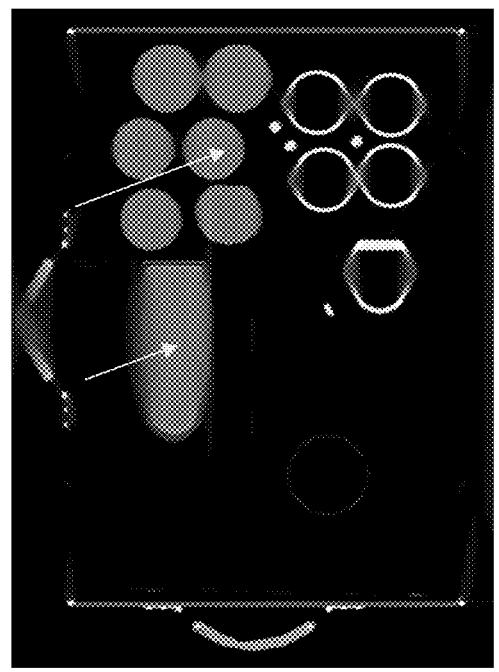
FIG. 11 is an image of an object to be inspected generated by a linear scanning trajectory based imaging system in the prior art.
Figure 12:
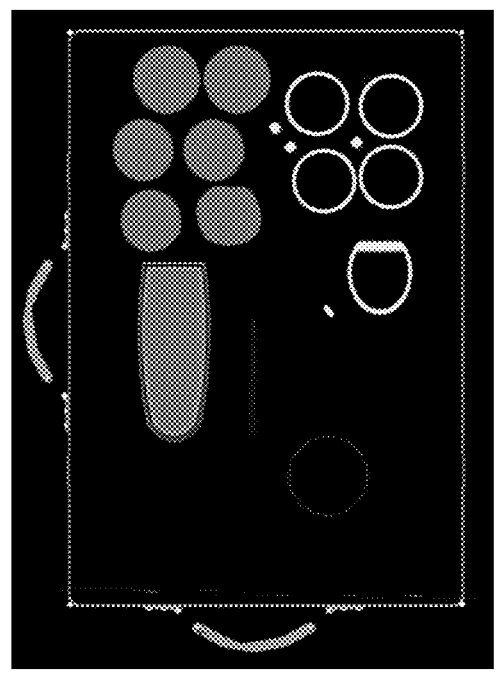
FIG. 12 is an image of the object to be inspected generated by the scanning imaging system in accordance with an embodiment of the disclosure.

In order to show the effect of the scanning imaging system of the embodiments of the disclosure more visually, please refer to FIGS. 11 and 12.

FIG. 11 is an image of the object 104 to be inspected, which is generated by a linear scanning trajectory based imaging system in the prior art. It is found that there are obvious cone artifacts at positions indicated by arrows in upper and lower parts of the image.

FIG. 12 is an image of the object 104 to be inspected, which is generated by the scanning imaging system of embodiments of the disclosure. It is found that the cone artifacts are effectively restricted, and the generated image is more clear and balanced.

According to an embodiment of the disclosure, the scanning imaging system further includes a pulse generator (not shown) configured for generating a trigger pulse sequence for controlling the plurality of radiographic sources 102 to emit the ray beams alternately. Specifically, the pulse trigger sequence may include the following situations:

In a first situation, the trigger pulse sequence includes trigger pulse signals corresponding to the plurality of radiographic sources 102 one by one within one cycle, and the trigger pulse signals are used to control the radiographic sources 102 to emit the ray beams with the same energy.

Figure 13:
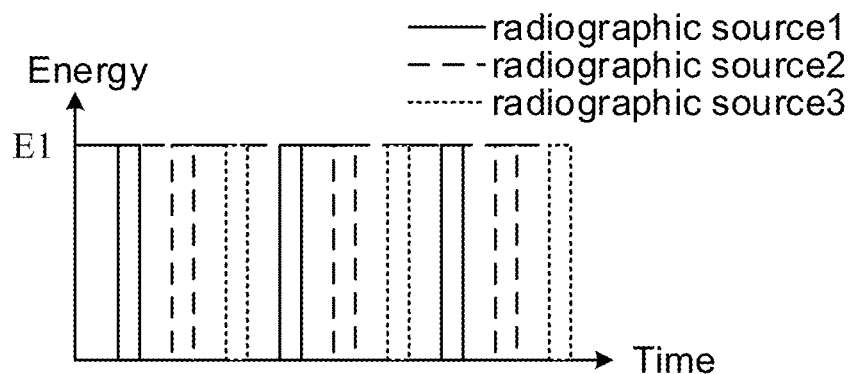
FIG. 13 is a schematic diagram of a trigger pulse sequence in accordance with an embodiment of the disclosure.

For example, FIG. 13 shows the trigger pulse signals corresponding to three radiographic sources 102 one by one. The horizontal coordinate axis represents time and the trigger pulse signals corresponding to the three radiographic sources 102 one by one are alternately arranged along the time axis. The vertical coordinate axis represents energy, and the energy indicated by all of the trigger pulse signals is E1. The projection image data obtained by this way is complete data applicable for mono-energy CT reconstruction.

In a second situation, the trigger pulse sequence includes multiple groups of trigger pulse signals within one cycle, each group corresponding to a corresponding one radiographic source 102. The group of trigger pulse signals includes a first trigger pulse signal and a second trigger pulse signal, which are used to control a corresponding one radiographic source 102 to emit a first sub ray beam with first energy and a second sub ray beam with second energy in turn. The radiographic sources 102 may be dual-energy accelerators with adjustable energy.

Figure 14:
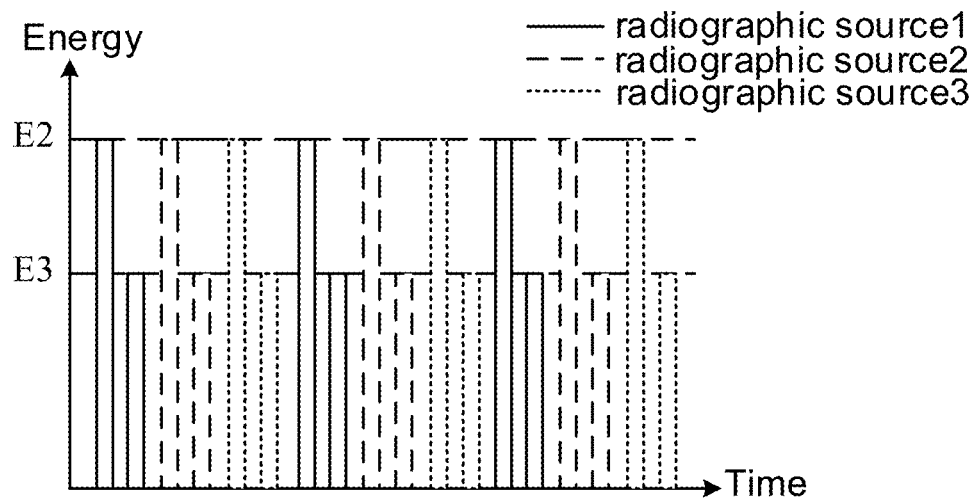
FIG. 14 is a schematic diagram of the trigger pulse sequence in accordance with another embodiment of the disclosure.

For example, FIG. 14 shows groups of trigger pulse signals corresponding to the three radiographic sources 102 one by one, that is, each radiographic source 102 emits two ray beams. The horizontal coordinate axis represents time, and the groups of trigger pulse signals corresponding to the three radiographic sources 102 one by one are alternately arranged along the time axis. The vertical coordinate axis represents energy, and the energy indicated by the first trigger pulse signal in each group of trigger pulse signals is E2, and the energy indicated by the second trigger pulse signal in each group of trigger pulse signals is E3. The projection image data obtained by this way is complete data applicable for dual-energy CT reconstruction.

Principles of dual-energy CT reconstructing an image is described below:

Firstly, the object to be inspected is scanned by dual-energy rays to obtain dual-energy projection data.

Secondly, based on a pre-built lookup table or by solving equations, projection values of base material coefficients corresponding to the dual-energy projection data are calculated. The way to create the lookup table is to select two basic materials, calculate projection values of the double-energy rays penetrating through the two base materials of different thicknesses, and create the lookup table according to relationships between high-low energy projection values and different combinations of thicknesses. The method of solving equations is to, get a corresponding combination of thicknesses by calculating high-low energy projection equations under decomposition of the base materials based on actual high-low energy projection values.

Thirdly, the distribution map of the base material coefficients may be obtained from the projection values of the base materials. The atomic number, the characteristic density image and the attenuation coefficient image of the object to be inspected at any energy may be obtained from the base material coefficient distribution, so as to classify the object in substance and recognize the object automatically.

It should be noted that in order to implement dual-energy CT reconstruction based on the projection image data in the second situation, the scanning imaging system further includes a decomposing unit configured for decomposing first sub projection images and second sub projection images corresponding to the first sub ray beam and the second sub ray beam from the first projection images. The imaging unit is further configured for obtaining the first reconstructed image of the object 104 to be inspected based to the first sub projection images and the second sub projection images.

In a third situation, the radiographic sources 102 may be mono-energy accelerators with adjustable energy. The trigger pulse sequence includes trigger pulse signals corresponding to the plurality of radiographic sources 102 one by one within one cycle. In the first scanning process for the object 104 to be inspected, the trigger pulse signals are used to control the radiographic sources 102 to emit the ray beams with the same first energy; in the second scanning process for the object 104 to be inspected, the trigger pulse signals are used to control the radiographic sources 102 to emit the ray beams with the same second energy.

Figure 15:
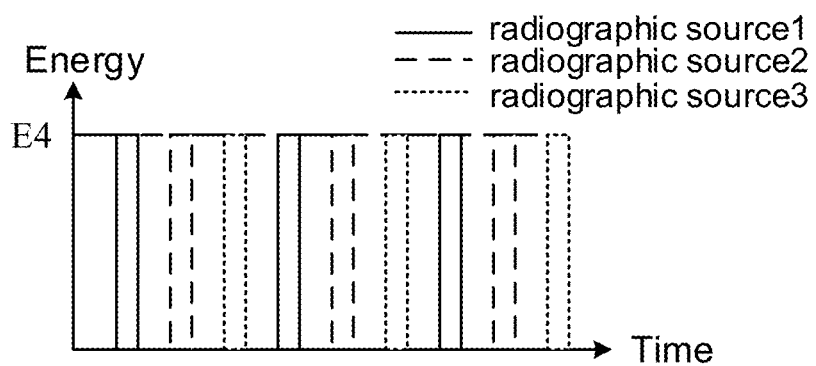
FIG. 15 is a schematic diagram of the trigger pulse sequence in accordance with yet another embodiment of the disclosure.

For example, the energy indicated by all of the trigger pulse signals is E1 during the first scanning process (see FIG. 13); the energy indicated by all of the trigger pulse signals is E4 during the second scanning process (see FIG. 15). The projection image data obtained in this way may also be used for dual-energy CT reconstruction. The obtained image information of the object 104 to be inspected includes high energy attenuation coefficients, low energy attenuation coefficients, atomic numbers, electron densities and so on, so the object to be inspected may be classified in substance and recognized automatically.

Figure 16:
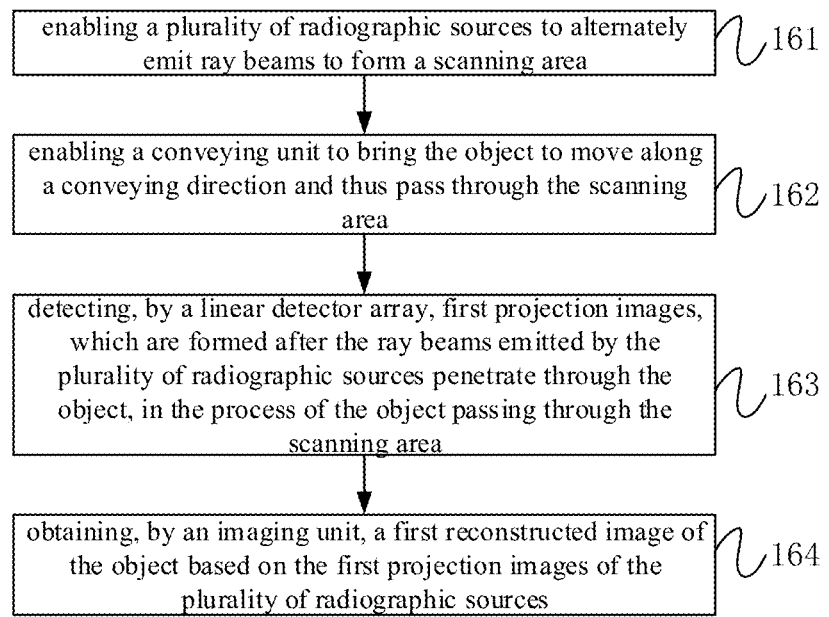
FIG. 16 is a flow chart of an imaging method of the scanning imaging system for security inspection of an object in accordance with an embodiment of the disclosure.

FIG. 16 is a flow diagram of a scanning imaging method for security inspection of an object in accordance with an embodiment of the disclosure, which is applied to the above described scanning imaging system for security inspection of an object. The scanning imaging method in FIG. 16 includes steps 161 to 164.

In step 161, the plurality of radiographic sources 102 are enabled to alternately emit the ray beams to form the scanning area.

In step 162, the conveying unit 101 is enabled to bring the object to move along the conveying direction and thus pass through the scanning area.

In step 163, the first projection images, which are formed after the ray beams emitted by the plurality of radiographic sources 102 penetrate through the object, in the process of the object passing through the scanning area are detected by the linear detector array 103.

In step 164, the first reconstructed image of the object is obtained by the imaging unit based on the first projection images of the plurality of radiographic sources 102.

In a preferred embodiment, the linear detector array 103 includes a plurality of linear-array detectors 1031 successively arranged along the conveying direction of the conveying unit 101, and the scanning imaging method further includes: detecting, by the plurality of linear-array detectors 1031, the first projection images, which are formed after the ray beams emitted by the plurality of radiographic sources 102 penetrate through the object, in the process of the object passing through the scanning area, respectively.

Specifically, the step of obtaining the first reconstructed image of the object includes: reconstructing the first reconstructed image of the object from the first projection images of the plurality of radiographic sources with a CT reconstructing algorithm.

Figure 17:
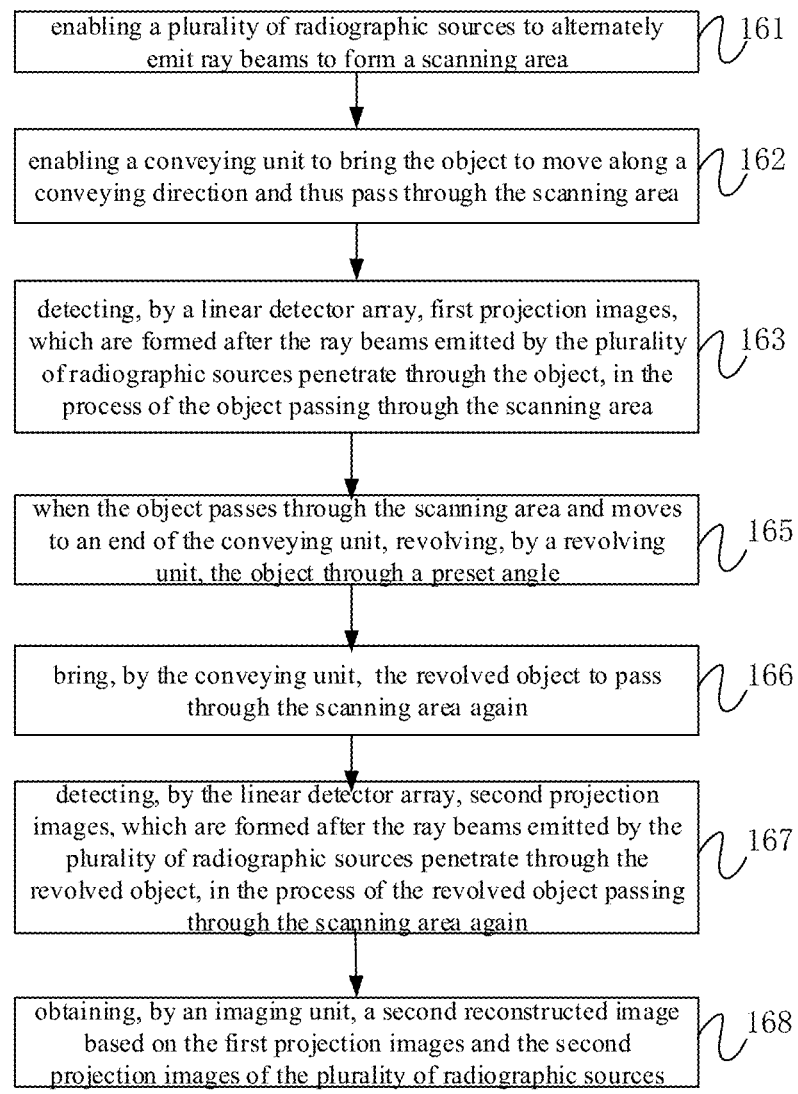
FIG. 17 is a flow chart of the imaging method of the scanning imaging system for security inspection of an object in accordance with another embodiment of the disclosure.

FIG. 17 is a flow diagram of a scanning imaging method for security inspection of an object in accordance with another embodiment of the disclosure. The difference between FIG. 17 and FIG. 16 is that FIG. 17 further includes steps 165 to 168 after step 103.

In step 165, when the object passes through the scanning area and moves to the end of the conveying unit 101, the object is revolved through the preset angle by the revolving unit 901, wherein the revolving unit 901 is located at an end of the conveying unit 101 (see FIG. 9).

In step 166, the revolved object is brought by the conveying unit 101 to pass through the scanning area again.

In step 167, the second projection images, which are formed after the ray beams emitted by the plurality of radiographic sources 102 penetrate through the revolved object, in the process of the revolved object passing through the scanning area are detected by the linear detector array 103.

In step 168, the second reconstructed image of the object is obtained by the imaging unit based on the first projection images and the second projection images of the plurality of radiographic sources 102.

According to an embodiment of the disclosure, the scanning imaging system further includes the pulse trigger, and before the step of enabling the plurality of radiographic sources 102 to alternately emit the ray beams to form the scanning area, the scanning imaging method further includes: generating, by the pulse trigger, the trigger pulse sequence for controlling the plurality of radiographic sources 102 to alternately emit the ray beams.

The trigger pulse sequence may include the trigger pulse signals corresponding to the plurality of radiographic sources 102 one by one within one cycle, and the trigger pulse signals are used to control the radiographic sources 102 to emit the ray beams with the same energy.

The trigger pulse sequence may also include the multiple groups of trigger pulse signals within one cycle, the group corresponding to a corresponding radiographic source 102. The group of trigger pulse signals includes the first trigger pulse signal and the second trigger pulse signal, which are used to control a corresponding radiographic source 102 to emit the first sub ray beam having first energy and a second sub ray beam having second energy.

Figure 18:
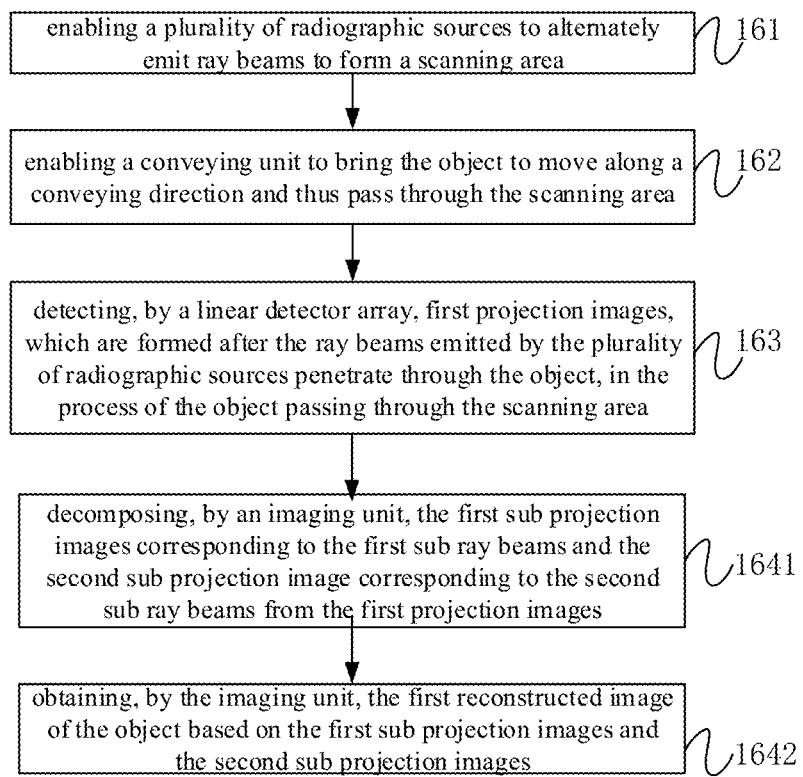
FIG. 18 is a flow chart of the imaging method of the scanning imaging system for security inspection of an object in accordance with yet another embodiment of the disclosure.

In view of the situation that the group of trigger pulse signals includes the first trigger pulse signal and the second trigger pulse signal, the scanning imaging system further includes a decomposing unit. FIG. 18 is a flow diagram of the scanning imaging method for security inspection of an object in accordance with another embodiment of the disclosure. The difference between FIG. 18 and FIG. 16 is that step 164 in FIG. 16 may be divided into steps 1641 and step 1642 in FIG. 18.

In step 1641, the first sub projection images corresponding to the first sub ray beam and the second sub projection image corresponding to the second sub ray beam are decomposed by the imaging unit from the first projection images.

In step 1642, the first reconstructed image of the object is obtained by the imaging unit based on the first sub projection images and the second sub projection images.

It should be clarified that respective embodiments in the description are described in a progressive manner, and the same or similar parts of respective embodiments may be referenced to by each other, and each embodiment focuses on the difference between the embodiment and the other embodiments. For device embodiments, related parts may be seen in the method embodiment of the disclosure. The embodiments of the disclosure are not limited to the specific steps and structures shown in the above drawings and described above. The person skilled in the art may, after understanding the spirit of the embodiments of the disclosure, make various changes, modifications and additions, or change the order between steps. Moreover, for the sake of simplicity, detailed description of known methods and techniques are omitted here.

However, it should be clarified that embodiments of the disclosure are not limited to the specific configurations described above and shown in the drawings. Moreover, for sake of simplicity, detailed description of known methods and techniques are omitted here. In the above embodiments, a number of specific steps are described and illustrated as examples. However, the process of the embodiments of the disclosure is not limited to the specific steps described and shown above, and the person skilled in the art may make various changes, modifications and additions, or change the order between the steps, after understanding the spirit of the embodiments of the disclosure.

Function blocks shown in the above structure block diagrams may be implemented as hardware, software, firmware or a combination thereof. When implemented in hardware, they may be, for example, electronic circuits, ASICs, proper firmware, plug-ins, function cards and so on. When implemented in software, elements of embodiments of the disclosure are a program or code segment for performing required tasks. Programs or code segments may be stored in machine readable media, or transmitted by means of data signals carried in carriers in transmission media or communication links. The machine readable medium may include any medium that may store or transmit information. Examples of the machine-readable media include electronic circuits, semiconductor memory devices, ROMs, flash memories, erasable ROMs (EROMs), floppy disks, CD-ROMs, discs, hard disks, optical fiber media, radio frequency (RF) links, and so on. The code segment may be downloaded through a computer network such as Internet, Intranet and so on.

The person skilled in the art should understand that the above embodiments are exemplary rather than restrictive. Different technical features appearing in different embodiments may be combined to achieve beneficial effects. On the basis of studying the drawings, the description and the claims, the person skilled in the art should be able to understand and implement other modified embodiments of the described embodiments. In the claims, the term "include" does not exclude other devices or steps; the indefinite article "a/an" does not exclude "multiple"; the term "first" and "second" are used to mark the name rather than to express any particular order. Any reference number in the claims shall not be interpreted as limiting the protection scopes of the claims. Functions of multiple parts in the claims may be realized by a separate hardware or software module. Certain technical features appear in different dependent claims, which does not mean that these technical features cannot be combined to achieve beneficial effects.

What is claimed is:

1. A scanning imaging system for security inspection of an object, comprising:
    a conveying unit configured for bringing the object to move along a conveying direction of the conveying unit;
    a plurality of radiographic sources at one side of the conveying unit, the plurality of radiographic sources being arranged successively in a direction vertical to a plane, in which the conveying unit is located, and configured for alternately emitting ray beams to form a scanning area;
    a linear detector array at the other side of the conveying unit, the linear detector array being configured for detecting first projection images, which are formed after the ray beams emitted by the plurality of radiographic sources penetrate through the object, in the process of the object passing through the scanning area; and
    an imaging unit configured for obtaining a first reconstructed image of the object based on the first projection images of the plurality of radiographic sources,
    wherein the linear detector array comprises a plurality of linear-array detectors arranged successively along the conveying direction of the conveying unit, and wherein the plurality of linear-array detectors are arranged centripetally around a vertical line, on which the plurality of radiographic sources are located, and each linear-array detector is arranged to deflect towards the vertical line, on which the radiographic sources are located.

2. The scanning imaging system of claim 1, wherein the plurality of radiographic sources are arranged such that a projection of a vertical line, on which the plurality of radiographic sources are located, on a plane, in which the linear detector array is located, is at a middle position of the linear detector array.

3. The scanning imaging system of claim 1, the plurality of linear-array detectors being configured for detecting the first projection images, which are formed after the ray beams emitted by the plurality of radiographic sources penetrate through the object, in the process of the object passing through the scanning area, respectively.

4. The scanning imaging system of claim 1, further comprising a revolving unit at an end of the conveying unit, the revolving unit being configured for revolving the object through a preset angle when the object passes through the scanning area and moves to an end of the conveying unit, wherein
    the conveying unit is further configured for bringing the revolved object to pass through the scanning area,
    the linear detector array is further configured for detecting second projection images, which are formed after the ray beams emitted by the plurality of radiographic sources penetrate through the revolved object, in the process of the revolved object passing through the scanning area, and
    the imaging unit is further configured for obtaining a second reconstructed image of the object based on the first projection images and the second projection images of the plurality of radiographic sources.

5. The scanning imaging system of claim 1, further comprising a pulse generator configured for generating a trigger pulse sequence for controlling the plurality of radiographic sources to alternately emit the ray beams.

6. The scanning imaging system of claim 5, wherein the trigger pulse sequence comprises trigger pulse signals corresponding to the plurality of radiographic sources one by one within each cycle, the trigger pulse signals being used for controlling the radiographic sources to emit the ray beams with the same energy.

7. The scanning imaging system of claim 5, wherein the trigger pulse sequence comprises trigger pulse signal groups corresponding to the plurality of radiographic sources one by one within each cycle, the trigger pulse signal group comprising a first trigger pulse signal and a second trigger pulse signal, which are used for controlling a corresponding radiographic source to emit a first sub ray beam with first energy and a second sub ray beam with second energy in turn.

8. The scanning imaging system of claim 7, further comprising a decomposing unit configured for decomposing the first projection images into first sub projection images corresponding to the first sub ray beam and second sub projection images corresponding to the second sub ray beam, wherein
the imaging unit is further configured for obtaining the first reconstructed image of the object based on the first sub projection images and the second sub projection images.

9. The scanning imaging system of claim 1, wherein the radiographic sources are acceleration radiographic sources.

10. A scanning imaging method for security inspection of an object, the scanning imaging method applied to the scanning imaging system for security inspection of an object, the method comprising:
enabling a plurality of radiographic sources to alternately emit ray beams to form a scanning area;
enabling a conveying unit to bring the object to move along a conveying direction and thus pass through the scanning area;
detecting, by a linear detector array, first projection images, which are formed after the ray beams emitted by the plurality of radiographic sources penetrate through the object, in the process of the object passing through the scanning area; and
obtaining, by an imaging unit, a first reconstructed image of the object based on the first projection images of the plurality of radiographic sources.

11. The scanning imaging method of claim 10, wherein the linear detector array comprises a plurality of linear-array detectors arranged successively along the conveying direction of the conveying unit, the scanning imaging method further comprising:
detecting, respectively by the plurality of linear-array detectors, the first projection images, which are formed after the ray beams emitted by the plurality of radiographic sources penetrate through the object, in the process of the object passing through the scanning area.

12. The scanning imaging method of claim 10, wherein the step of obtaining the first reconstructed image of the object comprises:
reconstructing the first reconstructed image of the object from the first projection images of the plurality of radiographic sources with a CT reconstructing algorithm.

13. The scanning imaging method of claim 10, wherein the scanning imaging system further comprises a revolving unit at an end of the conveying unit, the scanning imaging method further comprising:
revolving, by the revolving unit, the object through a preset angle when the object passes through the scanning area and moves to an end of the conveying unit;
bringing, by the conveying unit, the revolved object to pass through the scanning area;
detecting, by the linear detector array, second projection images, which are formed after the ray beams emitted by the plurality of radiographic sources penetrate through the revolved object, in the process of the revolved object passing through the scanning area; and
obtaining, by the imaging unit, a second reconstructed image of the object based on the first projection images and the second projection images of the plurality of radiographic sources.

14. The scanning imaging method of claim 10, wherein the scanning imaging system further comprises a pulse generator, before the step of forming the scanning area, the scanning imaging method further comprising:
generating, by the pulse generator, a trigger pulse sequence for controlling the plurality of radiographic sources to alternately emit the ray beams.

15. The scanning imaging method of claim 14, wherein the trigger pulse sequence comprises trigger pulse signals corresponding to the plurality of radiographic sources one by one within each cycle, the trigger pulse signals being used for controlling the radiographic sources to emit the ray beams with the same energy.

16. The scanning imaging method of claim 14, wherein the trigger pulse sequence comprises trigger pulse signal groups corresponding to the plurality of radiographic sources one by one within each cycle, the trigger pulse signal group comprising a first trigger pulse signal and a second trigger pulse signal, which are used for controlling a corresponding radiographic source to emit a first sub ray beam with first energy and a second sub ray beam with second energy in turn.

17. The scanning imaging method of claim 16, wherein the scanning imaging system further comprises a decomposing unit, the step of obtaining the first reconstructed image of the object comprising:
decomposing, by the decomposing unit, the first projection images into first sub projection images corresponding to the first sub ray beam and second sub projection images corresponding to the second sub ray beam;
obtaining, by the imaging unit, the first reconstructed image of the object based on the first sub projection images and the second sub projection images.

* * * * *